US008463448B2

(12) United States Patent
Burt et al.

(10) Patent No.: US 8,463,448 B2
(45) Date of Patent: Jun. 11, 2013

(54) APPLIANCE HAVING A USER GRACE PERIOD FOR REINITIATING OPERATING WHEN IN DEMAND RESPONSE ENERGY MODE

(75) Inventors: Ashley Wayne Burt, Louisville, KY (US); Michael F. Finch, Louisville, KY (US); Gregory F. Gawron, Louisville, KY (US); Mark Davis Johnson, Louisville, KY (US); Jeffrey S. Weber, Louisville, KY (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 12/644,722

(22) Filed: Dec. 22, 2009

(65) Prior Publication Data

US 2011/0148390 A1    Jun. 23, 2011

(51) Int. Cl.
*G05D 11/00* (2006.01)
(52) U.S. Cl.
USPC ............................ 700/286; 700/291; 700/295
(58) Field of Classification Search
USPC ................. 700/286, 291, 295, 296, 297, 298, 700/306
See application file for complete search history.

(56) References Cited

U.S. PATENT DOCUMENTS

| 4,998,024 A | * | 3/1991 | Kirk et al. ........................ 307/40 |
| 2004/0098171 A1 | * | 5/2004 | Horst ............................ 700/295 |
| 2009/0099699 A1 | * | 4/2009 | Steinberg et al. ............. 700/278 |
| 2011/0087382 A1 | * | 4/2011 | Santacatterina et al. ...... 700/291 |

* cited by examiner

*Primary Examiner* — Mohammad Ali
*Assistant Examiner* — Nathan Laughlin
(74) *Attorney, Agent, or Firm* — Global Patent Operation (57) ABSTRACT

An energy consuming device comprises a power consuming feature/function and a controller operatively connected to the power consuming feature/function. The controller is configured to operate the device including the power consuming feature/function in one of a plurality of operating modes, including at least a normal operating mode during an associated off-peak demand period of an associated energy supplying utility and an energy savings mode during an associated peak demand period of the associated energy supplying utility. The controller is configured to provide a user a grace period during the associated peak demand period to allow the user to change the operating mode of the power consuming feature/function from the energy savings mode to another operating mode including the normal operating mode thereby allowing additional use of the power consuming feature/function during the associated peak demand period.

20 Claims, 3 Drawing Sheets

APPLIANCE HAVING A USER GRACE PERIOD FOR REINITIATING OPERATING WHEN IN DEMAND RESPONSE ENERGY MODE

BACKGROUND

The present disclosure relates to energy management, and more particularly to power consuming device control methods and electrical energy consumption systems.

Many utilities are currently experiencing a shortage of electric generating capacity due to increasing consumer demand for electricity. Currently utilities generally charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened. In order to reduce high peak power demand, many utilities have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a consumer typically manually operates power consuming devices during the off-peak times. This is undesirable because the consumer may not always be present in the home to operate the power consuming devices during off-peak hours. This is also undesirable because the consumer is required to manually track the current time to determine what hours are off-peak and on-peak. One proposed third party solution is to provide a system where a controller "switches" the actual energy supply to the power consuming devices on/off and/or adjusts the energy supply to the power consuming devices. However, there is no active control beyond the mere on/off switching and/or adjustment. One difficulty of this method is that if the consumer is using the power consuming device as the utility switches to the peak demand and then inadvertently turns the power consuming device off, the energy supply to the power consuming device will be switched off and/or adjusted by the controller. In some instances, the consumer will have to wait until the peak demand period is over before full use of the power consuming device is available. In other instances, the consumer will be required to navigate through an oftentimes cumbersome override process to regain immediate full use of the power consuming device.

BRIEF DESCRIPTION

According to one aspect, an energy consuming device comprises a power consuming feature/function and a controller operatively connected to the power consuming feature/function. The controller is configured to operate the device including the power consuming feature/function in one of a plurality of operating modes, including at least a normal operating mode during an associated off-peak demand period of an associated energy supplying utility and an energy savings mode during an associated peak demand period of the associated energy supplying utility. The controller is configured to provide a user a grace period during the associated peak demand period to allow the user to change the operating mode of the power consuming feature/function from the energy savings mode to another operating mode including the normal operating mode thereby allowing additional use of the power consuming feature/function during the associated peak demand period.

According to another aspect, an appliance comprises a power consuming feature/function and a controller operatively connected to the power consuming feature/function. The controller is configured to receive and process a signal indicative of current state of an associated utility. The controller operates the appliance in at least one of a normal operating mode and an energy savings mode, in response to the received signal. The controller is configured to at least one of selectively adjust and disable the power consuming feature/function to reduce power consumption of the appliance in the energy savings mode. If the power consuming feature/function is activated and the appliance switches from the normal operating mode to the energy savings mode and a user then disables the power consuming feature/function, the controller is configured to provide a period of time for the user to reactive the power consuming feature/function and continue normal operation of the power consuming feature/function in the energy savings mode. If the power consuming feature/function is activated and the appliance switches from the normal operating mode to the energy savings mode and the power consuming feature/function is adjusted to reduce power consumption, the controller is configured to provide a period of time for the user to override the adjustment and continue normal operation of the power consuming feature/function in the energy savings mode.

According to yet another aspect, an appliance control method comprises determining a state for an associated energy supplying utility. The utility state is indicative of at least a peak demand period or an off-peak demand period. The appliance operates in a normal mode during the off-peak demand period. The appliance operates in an energy savings mode during the peak demand period. Any number of one or more power consuming features/functions of the appliance are at least one of selectively adjusted and disabled to reduce power consumption of the appliance in the energy savings mode. A grace period is provided in the energy savings mode to allow a user to continue operation of at least one power consuming feature/function in the normal mode. The normal mode is returned to after the peak demand period is over.

According to still yet another aspect, an appliance comprises one or more power consuming features/functions and a controller operatively connected to the one or more power consuming features/functions. The controller is configured to receive and process a signal indicative of current state of an associated utility, including at least one of a critical state and high demand state. The controller operates the appliance in one of a plurality of operating modes, including at least a normal operating mode and an energy savings mode, in response to the received signal. The controller is configured to at least one of selectively adjust and disable at least one of the one or more power consuming features/functions to reduce power consumption of the appliance in the energy savings mode during the critical state or high demand state. Prior to the at least one power consuming feature/function being at least one of selectively adjusted and disabled in the energy savings mode, the controller provides a finite period of time for a user to select to continue operation of the at least one power consuming feature/function in its current operating mode.

DETAILED DESCRIPTION

Figure 1:
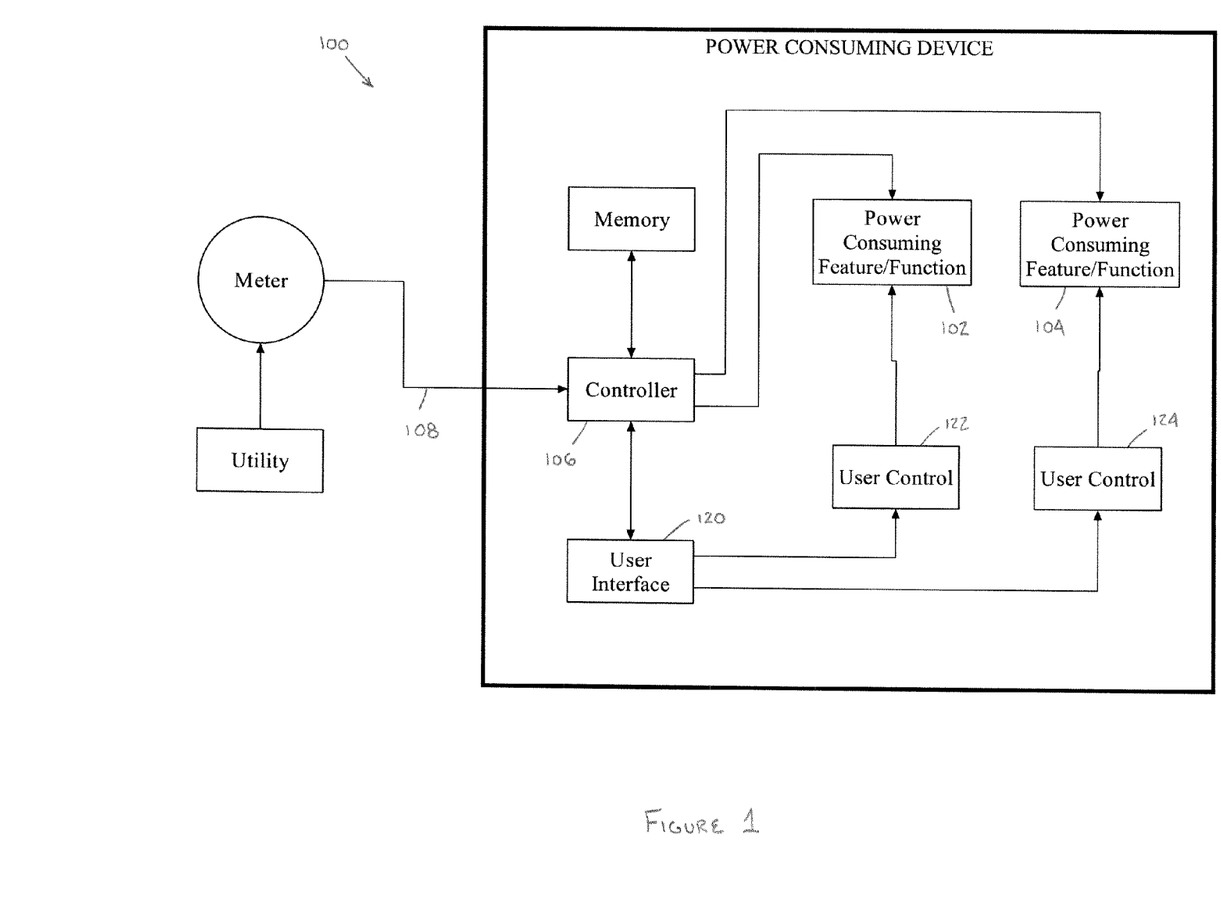
FIG. 1 is a schematic illustration of an exemplary demand managed power consuming device.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates a power consuming device 100 according to one aspect of the present disclosure. The power consuming device 100 comprises one or more power consuming features/functions 102, 104. A controller 106 is operatively connected to each of the power consuming features/functions. The controller 106 can include a memory and a micro computer on a printed circuit board which is programmed to selectively control the energization of the power consuming features/functions. The controller 106 is configured to receive and process a signal 108 indicative of a utility state, for example, availability and/or current cost of supplied energy. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 106 can operate the power consuming device 100 in one of a plurality of operating modes, including a normal operating mode and an energy savings mode in response to the received signal. Specifically, the power consuming device 100 can be operated in the normal mode in response to a signal indicating an off-peak demand state or period and can be operated in an energy savings mode in response to a signal indicating a peak demand state or period. The controller 106 is configured to selectively adjust and disable at least one of the one or more power consuming features/functions 102, 104 to reduce power consumption of the power consuming device 100 in the energy savings mode. It should be appreciated that the controller can be configured with default settings which govern normal mode and energy savings mode operation. Such settings in each mode can be fixed while others adjustable to user preference and to provide response to load shedding signals.

As will be discussed in greater detail below, the controller is configured to provide a user a grace period during the peak demand state or period to allow the user to change the operating mode of one of the power consuming features/functions 102,104 from the energy savings mode to another operating mode including the normal operating mode thereby allowing additional use of that power consuming feature/function during the peak demand state or period. According to one exemplary embodiment, the length of the grace period for each power consuming feature/function is adjustable by the user. According to another exemplary embodiment, the length of the grace period is variable and is at least partially based on operation of the power consuming feature/function 102, 104 prior to the power consuming device 100 switching to the energy savings mode. For example, a grace period for an oven could differ from a grace period for a cooktop. According to yet another exemplary embodiment, the grace period is a predetermined period, for example, two minutes.

By way of example only, according to one aspect of the present disclosure, if power consuming feature/function 102 is activated and the power consuming device 100 switches from the normal operating mode to the energy savings mode and a user then disables that power consuming feature/function at anytime during operation in the energy savings mode, the controller 106 is configured to provide a period of time for the user to reactive that power consuming feature/function 102 and continue normal operation of the power consuming feature/function in the energy savings mode. According to another aspect, if power consuming feature/function 102, for example, is activated and the power consuming device switches from the normal operating mode to the energy savings mode and that power consuming feature/function is adjusted to reduce power consumption, the controller is configured to provide a period of time for the user to override the adjustment and continue normal operation of that power consuming feature/function in the energy savings mode. Regarding power consuming feature/function 104, according to yet another aspect, the controller is configured to prevent the user from changing the operating mode of that power consuming feature/function 104 during the peak demand period.

The controller 106 is configured to limit the available operating modes of the power consuming feature/function 102 that the power consuming feature/function can switch to in the energy savings mode. According to one exemplary embodiment, the operating mode that the power consuming feature/function 102 can switch to during the peak demand period can be limited to the inverse of the operation of that power consuming feature/function in the energy savings mode. For example, the controller 106 is configured to allow the power consuming feature/function 102 to maintain its current consumption but not increase its current consumption in the energy savings mode. If the user takes an initial action to decrease the current consumption during the energy savings mode, the grace period allows the user to take a second action to increase the current consumption back to the amount of current consumption prior to the initial action.

With reference to FIG. 1, the power consuming device 100 further includes a control panel or user interface 120 operatively associated with the controller 106. The user interface can include a display and user controls 122, 124, such as control buttons, associated with the respective power consuming features/functions 102,104 for making various operational selections, such as selecting a power setting for each power consuming feature/function 102,104. At least one of the user controls 122, 124 has a first mode for controlling the operation of one of the power consuming features/functions and a second mode for selectively changing the operating mode of that power consuming feature/function. A light source can be provided for illuminating the user interface.

Figure 2:
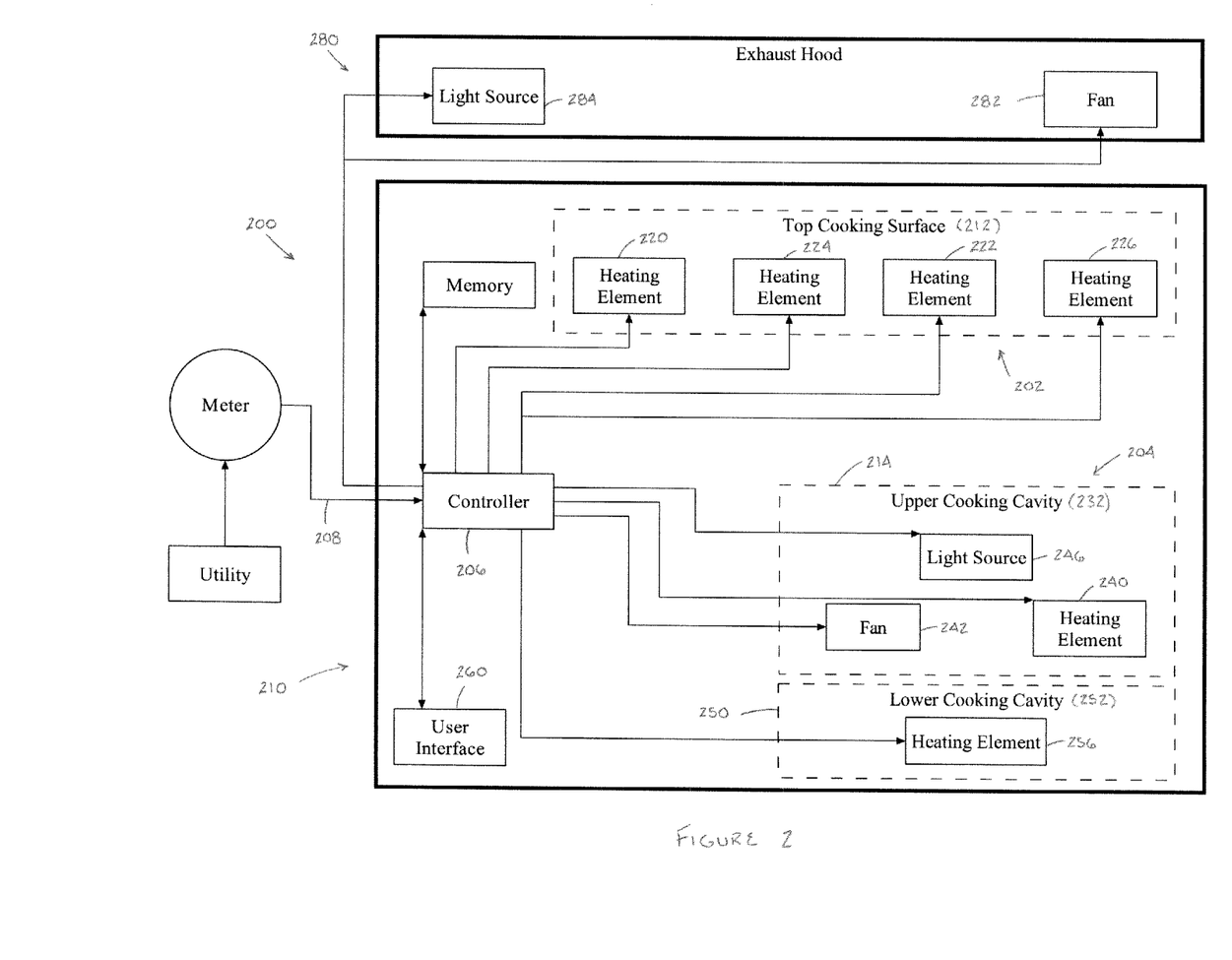
FIG. 2 is a schematic illustration of an exemplary demand managed cooking appliance.

An exemplary embodiment of a demand managed power consuming device is the cooking appliance 200 schematically illustrated in FIG. 2. The cooking appliance 200 comprises one or more power consuming features/functions 202, 204 and a controller 206 operatively connected to each of the power consuming features/functions. The controller 206 is configured to receive and process a signal 208 indicative of a utility state, for example, availability and/or current cost of supplied energy. The controller 206 can operate the cooking appliance 200 in one of a plurality of operating modes, including a normal operating mode and an energy savings mode, in response to the received signal. As shown in FIG. 2, the cooking appliance 200 is in the form of a free standing range 210 and power consuming feature/function 202 is a top cooking surface 212 and power consuming feature/function 204 is an oven 214. Although, it should be appreciated that the range is provided by way of illustration rather than limitation, and accordingly there is no intention to limit the power consuming device 100 of the present disclosure to any particular appliance. It will be understood that the control algorithms of the present disclosure could be applied to other power consuming devices such as a clothes dryer, water heater, pool pump, thermostat, and lighting controllers.

The depicted exemplary top cooking surface 212 includes four individual surface heating elements, namely, a left front heating element 220, a right front heating element 222, a left rear heating element 224, and a right rear heating element 226. The surface units could be temperature controlled heating elements for which the user selects the desired set point temperature or open loop duty cycle controlled elements for which the user selects the desired output power setting. In the illustrative embodiment, surface units 224 and 226 are temperature controlled and surface units 220 and 222 are duty cycle controlled. It should be apparent to those skilled in the art that top cooking surface 212 may include any suitable number of heating elements, any suitable type of heating elements (i.e., single, double or triple element which operates in different modes) and/or any suitable arrangement of the heating elements.

The exemplary oven 214 defines a cooking chamber or cavity 232, which has a maximum setpoint temperature in the normal operating mode. A drop door (not shown) sealingly closes a front opening of the oven during a cooking process and a door latch locks the door in a closed position during the cooking process and/or during a self-cleaning operation. The cooking cavity 232 is configured to receive and support a food item during the cooking process. The cooking cavity can be provided with at least one heating element 240. For example, the cooking cavity can be provided with an upper heating element, such as a broil heating element, and a lower heating element, such as a bake heating element. The cooking cavity 232 can also be provided with a convection fan 242 operatively associated with the cooking cavity for circulating heated air within the cooking cavity and a light source 246 for illuminating the cooking cavity.

The exemplary range 210 can also include a second oven 250 having a second cooking chamber or cavity 252. The second cooking cavity 252 may be configured substantially similar to first cooking cavity 232 or may be configured differently. The second cooking chamber 252 is equipped with one or more suitable heating elements 256, such as an heating element and a lower heating element, as described above in reference to the cooking cavity 232.

A range backsplash (not shown) can extend upward of a rear edge of top cooking surface 212 and can include, for example, a user interface 260, a control display and user controls, such as user controls 122, 124 (see FIG. 1), for user manipulation for facilitating selecting operative oven features, cooking timers, time and/or temperature displays. An exhaust hood 280 can be provided above the range 210. The exhaust hood can be operatively connected to the controller 206 and can include an exhaust fan 282 and a light source 284 for illuminating the top cooking surface 212.

In the normal operating mode, for use of the oven 214, a user generally inputs a desired temperature via the user control for the oven 214 and time at which the food item placed in the cooking cavity 232 is to be cooked through at least one input selector. The controller 206 then initiates the cooking cycle. In one exemplary embodiment, the controller 206 is configured to cyclically energize and de-energize the heating element 240 to heat the air and radiate energy directly to the food item. The duty cycle for the heating element 240, that is, the percent on time for the heating element in a control time period, can depend on at least one of a pre-programmed cooking algorithm and a user selected operation mode. The length of time the heating element is on during a particular control period varies depending on the power level selected. Similarly, in using the one of the heating elements 220, 222, 224, 226 of the top cooking surface 212, a user sets the temperature for elements 224 and 226 and the power output for elements 220 and 222 through a user control arranged to allow the user to select the desired output, for example, simmer, low, medium and high. Each individual temperature controlled surface heating element has a maximum setpoint temperature in the normal operating mode. The controller 206 controls the power output of the surface heating elements 220 and 222, by, for example, duty cycling the heating element at the particular duty cycle associated with the user selected power setting and controls the temperature for heating elements 224 and 226 by cycling the power in response to the sensed temperature of the utensil being heated over the element to maintain the selected setpoint temperature.

If the controller 206 receives and processes an energy signal indicative of a peak demand state or period at any time during operation of the appliance 200, the controller makes a determination of whether one or more of the power consuming features/functions should be operated in the energy savings mode and if so, it signals the appropriate features/functions of the appliance 200 to begin operating in the energy savings mode in order to reduce the instantaneous amount of energy being consumed by the appliance. The controller 206 determines what features/functions should be operated at a lower consumption level and what that lower consumption level should be and/or what feature/functions should be disabled, rather than an uncontrolled immediate termination of the operation of specific features/functions.

In order to reduce the peak energy consumed by the cooking appliance 200, the controller 206 is configured to at least one of selectively delay, adjust and disable at least one of the one or more above described power consuming features/functions to reduce power consumption of the cooking appliance 100 in the energy savings mode. For example, the cooking cavity 232 has a maximum setpoint temperature in the normal operating mode. To reduce the power consumption of the oven 214 in the energy savings mode, the controller 206 is configured to reduce the setpoint temperature in the energy savings mode. For instance, the power of the heating element 240 of the cooking cavity 232 can be reduced by selectively adjusting the duty cycle of the heating element throughout a selected cooking cycle. The controller can disable or reduce the speed of the convection fan 242 and can disable or reduce the intensity of the light source 246. As indicated above, the range 210 can include the second oven 250 having the second cooking cavity 252. With this setup, the controller 206 is configured to disable one of the cooking cavities 232, 252, particularly the second cooking cavity, in the energy savings mode.

Regarding the top cooking surface 212, each individual surface heating element 220, 222, 224, 226 has a maximum setpoint temperature for the temperature controlled elements and maximum output power setting for the duty cycle controlled elements in the normal operating mode. To reduce power consumed by the top cooking surface, the controller 206 can limit the number of surface heating elements that can be energized simultaneously and is configured to reduce the setpoint temperature of at least one activated temperature controlled surface heating element in the energy savings mode. The controller 206 can also reduce power of an activated open loop duty cycle controlled surface heating element by selectively adjusting the duty cycle of the activated heating element. Further, in the energy savings mode, at least one surface heating element 220, 222, 224, 226 can be at least partially disabled.

To further reduce the power consumption of the appliance 100 in the energy savings mode, the controller 206 is configured to disable or reduce the speed of the exhaust fan 282 of the exhaust hood 280. The light source 284 can also be disabled or the intensity of the light source can be reduced.

As indicated previously, the controller 206 provides a finite period of time for a user to select to continue operation of a power consuming feature/function in its current operating mode during the peak demand period. It should be appreciated that the controller 206 can notify the user of the adjustment and/or disablement prior to initiation of the grace period. For example, an energy savings operation can be accompanied by a display on the control panel 260 which communicates activation of the energy savings mode. The energy savings mode display can include a display of "ECO", "Eco", "EP", "ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the appliance operating in the energy savings mode and a timer can be provided for the grace period.

Examples of the present disclosure are provided. Surface heating element 224 is activated and the appliance 200 switches from the normal operating mode to the energy savings mode. In the energy savings mode, surface heating element 224 is to be disabled by the controller 206. If a user mistakenly deactivates surface heating element 224, the energy supply to the surface heating element 224 will be switched off. Without a grace period to reactivate surface heating element 224, in some instances, the user will have to wait until the peak demand period is over before full use of surface heating element 224 is available and/or will be required to navigate through an oftentimes cumbersome override process to regain immediate full use of surface heating element 224. According to one aspect of the present disclosure, the controller 206 is configured to provide a period of time for the user to promptly reactivate surface heating element 224 and continue normal operation of surface heating element 224 in the energy savings mode. More particularly, the user is cooking a food item on heating element 224 and a peak demand mode is present which would disable the heating element if the user turned it off. The user turns the heating element off (purposely or not) and then realizes that the food item is not properly cooked. By having a grace period the user can simply reactivate the heating element and continue cooking. Without the grace period, the user would have to disable at least some of the demand response functionality to reactivate the heating element.

If a surface heating element is to be adjusted to reduce power consumption in the energy savings mode, the controller 206 is configured to provide a period of time for the user to override the adjustment and continue normal operation of that surface heating element in the energy savings mode. For example, surface heating elements 220, 222 have a maximum power setting and surface heating elements 224, 226 have a maximum setpoint temperature in the normal operating mode. The controller is configured to reduce the duty cycle associated with the selected power setting for activated surface heating element 220 and reduce the setpoint temperature of activated surface heating element 224 in the energy savings mode. The controller is configured to allow the user to increase the setpoint temperature of activated surface heating element 224 during the grace period and then continue full use of surface heating element 224 in the energy saving mode. Similarly the controller is configured to allow the user to maintain the normal duty associated with the selected power setting for element 220 during the grace period and then continue full use of that surface heating element in the energy saving mode.

As indicated previously, according to yet another aspect, the controller 206 is configured to prevent the user from changing the operating mode of at least one power consuming feature/function during the peak demand period. For example, while surface heating element 224 is activated the controller 206 switches appliance 200 from the normal operating mode to the energy savings mode. In the energy savings mode, surface heating element 224 is to be disabled and/or adjusted by the controller 206. If a user subsequently deactivates surface heating element 224 during the energy savings mode, the energy supply to the surface heating element 224 will be switched off and the user will be prevented from changing the operating mode of surface heating element 224 during the balance of that peak demand period.

Additional examples of the present disclosure are provided. Regarding the oven 214, if the cavity heating element 240 is activated as the cooking appliance 200 switches to the energy savings mode and the user then deactivates the cavity heating element 240, the controller 206 is configured to allow the user to reactivate the cavity heating element during the grace period and then continue full use of the cavity heating element in the energy saving mode. If the cavity heating element 240 is activated as the cooking appliance 200 switches to the energy savings mode, the controller is configured to reduce power of the cavity heating element 240 in the energy savings mode. The controller 206 is configured to allow the user to increase the power of the cavity heating element during the grace period and then continue full use of the cavity heating element in the energy saving mode. Regarding the exhaust hood 280, the controller 206 configured to disable or reduce the intensity of the light source 284 and disable or reduce the speed of the exhaust fan 282 in the energy savings mode. The controller 206 is configured to allow the user to reactivate or increase the intensity of the light source and reactivate or increase the speed of the fan during the grace period and then continue full use of those components in the energy saving mode.

It should also be appreciated that the determination of which power consuming features/functions are operated in a energy savings mode may depend on whether the appliance 200 is currently operating. In one embodiment, the controller 206 includes functionality to determine whether activation of the energy savings mode for any power consuming features/functions would potentially cause damage to any feature/function of the appliance 200 itself or would cause the appliance to fail to perform its intended function, such as a complete cooking of food in the cooking cavity 232 of the oven 214. If the controller determines that an unacceptable consequence may occur by performing an energy saving action, such as deactivating or curtailing the operation of a power consuming feature/function in the appliance 200, the controller may opt-out of performing that specific energy saving action or may institute or extend other procedures. For example, the controller 206 may determine that the deactivation or limitation of the operation of the convection fan 242 may result in overheating of the heating element 240 which has not yet been deactivated or limited. As a result, the controller allows normal operation of the convection fan to continue in order to avoid potential damage to the appliance.

The controller may also determine whether deactivation or curtailment of a power consuming feature/function would prevent the appliance from performing its desired function. For example, if the controller 206 determines that deactivation or curtailment of the heating element 240 would result in under-cooked food in the oven 214, the controller 206 may opt-out of performing that specific energy savings action or may increase the time that a function is performed, such as a length of cooking.

Figure 3:
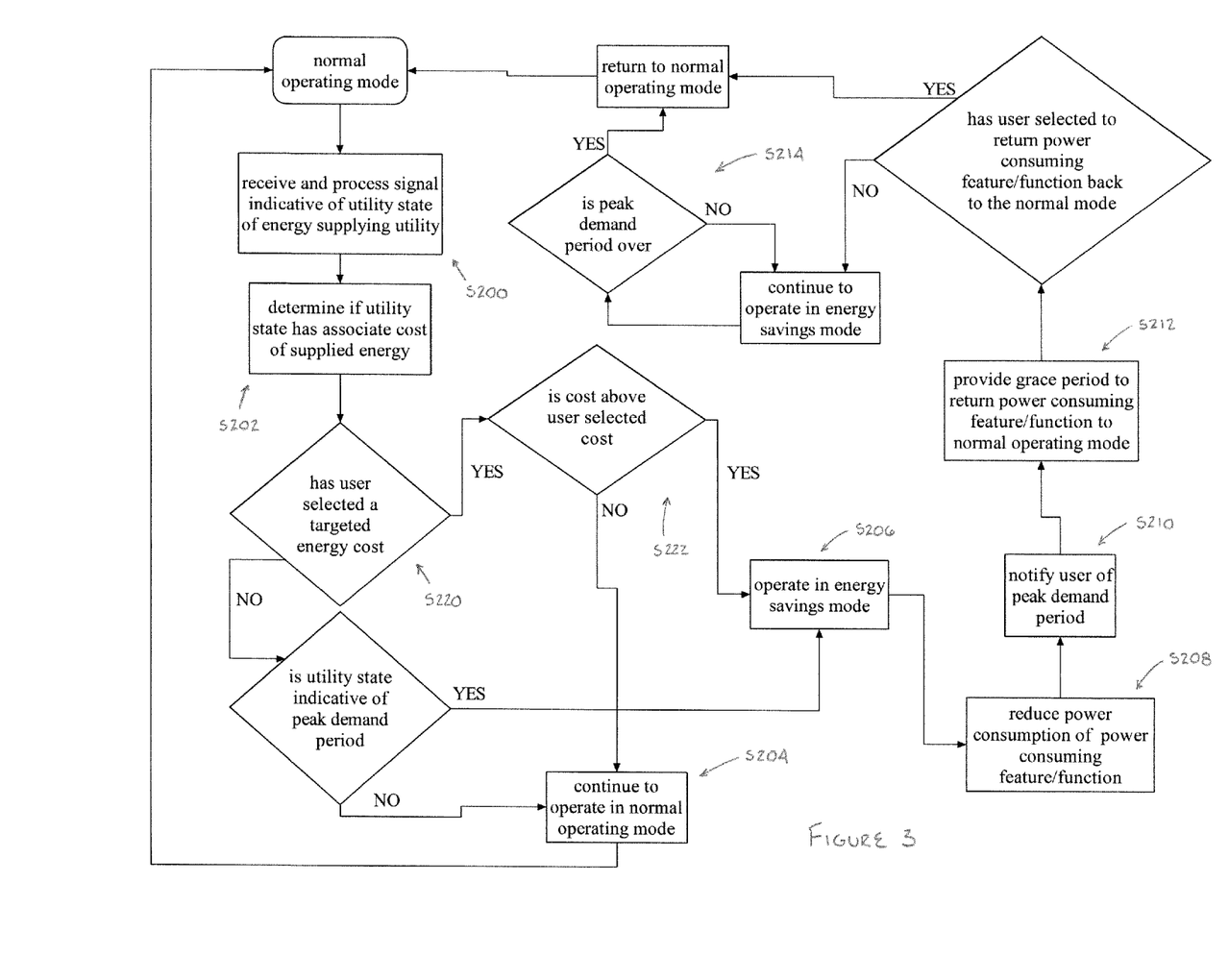
FIG. 3 is an exemplary operational flow chart for the power consuming device of FIG. 1.

With reference to FIG. 3, an exemplary control method for the power consuming device 100, such as the cooking appliance 200, in accordance with the present disclosure comprises receiving and processing the signal indicative of cost of supplied energy (S200); determining a state for an associated energy supplying utility, such as a cost of supplying energy from the associated utility (S202), the utility state being indicative of at least a peak demand period or an off-peak demand period, operating the appliance 200 in a normal mode during the off-peak demand period (S204); operating the appliance in an energy savings during the peak demand period (S206); scheduling, delaying, adjusting and/or selectively deactivating any number of one or more power consuming features/functions of the appliance 200 described above to reduce power consumption of the appliance in the energy savings mode (S208); alerting a user of a peak demand period (S210); providing a grace period in the energy savings mode to allow a user to continue operation of at least one power consuming feature/function in the normal mode (S212); and returning to the normal mode after the peak demand period is over (S214).

As indicated previously, the control panel or user interface 260 can include a display and control buttons for making various operational selections. The display can be configured to communicate active, real-time feedback to the user on the cost of operating the appliance 200. The costs associated with using the appliance 200 are generally based on the current operating and usage patterns and energy consumption costs, such as the cost per kilowatt hour charged by the corresponding utility. The controller 206 is configured to gather information and data related to current usage patterns and as well as current power costs. This information can be used to determine current energy usage and cost associated with using the appliance 200 in one of the energy savings mode and normal mode. This real-time information (i.e., current usage patterns, current power cost and current energy usage/cost) can be presented to the user via the display.

As shown in FIG. 3, it is to be appreciated that if the utility state has an associated energy cost, the user can base operation of the appliance on a user selected targeted energy cost, such a selected pricing tier or cost per kilowatt hour charged by the corresponding utility (S220). If the current cost exceeds the user selected cost, the controller 104 will operate the appliance 100 in the energy savings mode (S222). If the current cost is less than the user selected cost, the controller 104 will operate the appliance 100 in the normal mode (S222). This operation based on a user selected targeted energy cost is regardless of the current energy cost being indicative of one of a peak demand period and an off-peak demand period.

The duration of time that the power consuming device 100 operates in the energy savings mode may be determined by information in the energy signal. For example, the energy signal may inform the power consuming device 100 to operate in the energy savings mode for a few minutes or for one hour, at which time the power consuming device returns to normal operation. Alternatively, the energy signal may be continuously transmitted by the utility provider, or other signal generating system, as long as it is determined that instantaneous load reduction is necessary. Once transmission of the signal has ceased, the power consuming device 100 returns to normal operating mode. In yet another embodiment, an energy signal may be transmitted to the appliance to signal the power consuming device to operate in the energy savings mode. A normal operation signal may then be later transmitted to the power consuming device 100 to signal the power consuming device 100 to return to the normal operating mode.

The operation of the power consuming device 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 106 is configured to operate the power consuming device 100 in an operating mode corresponding to one of the price tiers. For example, the controller is configured to operate the cooking appliance 200 in the normal operating mode during each of the low and medium price tier and is configured to operate the appliance in the energy savings mode during each of the high and critical price tier. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An energy consuming device comprising:
a power consuming feature/function;
a controller operatively connected to the power consuming feature/function, the controller being configured to operate said energy consuming device in one of a plurality of operating modes, including at least a normal operating mode during an associated off peak demand period of an associated energy supplying, utility and an energy sayings mode during an associated peak demand period of the associated energy supplying utility,
wherein the controller is configured to provide a user a grace period to allow the user to change the operation of the power consuming feature/function, and
wherein the grace period defines a period of time that the controller begins in response to a change from the normal operating mode to the energy savings mode, and wherein, in response to the expiration of the grace period, the controller prohibits the user to change the operation of the power consuming feature/function during the energy savings mode, thereby preventing additional use of the power consuming feature/function during the associated peak demand period.

2. The device of claim 1, wherein to controller is configured to allow the power consuming feature/function to maintain its current consumption but not increase its current consumption in the energy savings mode, wherein if the user takes an initial action to decrease the current consumption during the energy savings mode the grace period allows the user to take a second action to increase the current consumption back to the amount of current consumption prior to the initial action.

3. The device of claim 1, further comprising a second power consuming feature/function operatively connected to the controller, the controller being configured to operate the second power consuming feature/function in a normal operating mode during the associated off-peak demand period and an energy savings mode during the associated peak demand period, wherein the controller is configured to prevent the user from changing the operating mode of the second power consuming feature/function during the associated peak demand period.

4. The device of claim 1, further including a user interface operatively associated with the controller, the user interface including a user control associated with the power consuming feature/function, the user control having a first mode for controlling the operation of the power consuming feature/function and a second mode for selectively changing the operating mode of the power consuming feature/function.

5. The device of claim 1, wherein the length of the grace period is adjustable by the user.

6. The device of claim 1, wherein the length of the grace period, is variable, the length being at least partially based on operation of the power consuming feature/function prior to the device switching to the energy savings mode.

7. The device of claim 1, wherein the controller is configured to limit the available operating modes of the power consuming feature/function that the power consuming feature/function can switch to in the energy savings mode.

8. The device of claim 7, wherein the operating mode that the power consuming feature/function can switch to during the associated peak demand period is limited to the inverse of the operation of the power consuming feature/function in the energy savings mode.

9. The device of claim 1, wherein the device the power consuming feature/function is a cooking surface having individual surface beating elements, the controller being configured to at least partially disable one of the surface heating elements in the energy savings mode, wherein if that surface heating element to be disabled is activated as the device switches to the enemy savings mode and the user then deactivates that surface heating element, the controller is configured to allow the user to reactivate that surface heating element during the grace period and then continue full use of that surface heating element in the energy saving mode.

10. The device of claim 9, wherein each individual surface heating element has a maximum setpoint temperature in the normal operating mode, the controller being configured to reduce the setpoint temperature of an activated surface heating element in the energy savings mode, wherein the controller is configured to allow the user to increase the setpoint temperature of that activated surface heating element during the grace period and then continue full use of that surface heating element in the energy saving mode.

11. The device of claim 9, Wherein the controller is configured to reduce power of an activated surface heating element by selectively adjusting a duty cycle of the activated heating element in the energy savings mode, wherein the controller is configured to allow the user to increase the power of that activated surface heating element during the grace period and then continue full use of that surface heating element in the energy saving mode.

12. The device of claim 1, wherein the power consuming feature/function is a cooking cavity having a cavity heating element, the controller being configured to at least partially disable the cavity heating elements in the energy savings mode, wherein if the cavity heating element is activated as the device switches to the energy savings mode and the user then deactivates the cavity heating element, the controller is configured to allow the user to reactivate the cavity heating element during the grace period and then continue full use of the cavity heating element in the energy saving mode.

13. The device of claim 12, wherein if the cavity beating element is activated as the device switches to the energy savings mode the controller is configured to reduce power of the cavity heating element in the energy savings mode, wherein the controller is configured to allow the user to increase the power of the cavity heating element during the grace period and then continue full use of the cavity heating element in the energy saving mode.

14. The device of claim 1, wherein the power consuming feature/function includes a light source and an exhaust an, the controller being configured to disable or reduce the intensity of the light source and disable or reduce the speed of the exhaust fan in the energy savings mode, wherein the controller is configured to allow the user to reactivate or increase the intensity of the light source and reactivate or increase the speed of the fan during the grace period and then continue full use of the light source and exhaust fan in the energy saving mode.

15. An appliance, comprising:
a power consuming feature/function; and
a controller operatively connected to the power consuming feature/function, the controller being configured to receive and process a signal indicative of current state of an associated utility, the controller operating the appliance in at least one of a normal operating mode and an energy savings mode, in response to the received signal, the controller being configured to at least one of selectively adjust and disable the power consuming feature/function to reduce power consumption of the appliance in the energy savings mode,
wherein the controller is configured to provide a grace period that defines a period of time that the controller begins in response to a change from the normal operating mode to the energy savings mode,
wherein, in response to the expiration of the grace period, the controller prohibits a user to change the operation of the power consuming feature/function during the energy savings mode, thereby preventing additional use of the power consuming feature/function during the associated peak demand period,
wherein if the power consuming feature/function is activated and the appliance switches from the normal operating mode to the energy savings mode and a user then disables the power consuming feature/function, the grace period defines a first period of time for the user to reactivate the power consuming feature/function and continue normal operation of the power consuming feature/function in the energy savings mode, and wherein if the power consuming feature/function is activated and the appliance switches from the normal operating mode to the energy savings mode and the power consuming feature/function is adjusted to reduce power consumption, the grace period defines a second period of time for the user to modify the adjustment and continue normal operation of the power consuming feature/function in the energy savings mode.

16. The appliance of claim 15, further comprising a user interface operatively associated with the controller, the user interface including a user control having a first mode for controlling the operation of the power consuming feature/function and a second mode for selecting the operating mode of the first power consuming feature/function.

17. The appliance of claim 15, wherein the grace period adjustable by the user.

18. The appliance of claim 15, wherein the grace period is variable and is at least partially based on operation of the power consuming feature/function prior to the appliance switching to the energy savings mode.

19. A control method for an appliance, said method comprising:

determining a state for an associated energy supplying utility, the utility state being indicative of at least a peak demand period or an off-peak demand period;

operating the appliance in a normal mode during the off-peak demand period;

operating the appliance in an energy savings mode during the peak demand period;

operating any number of one or more power consuming features/functions of the appliance to reduce power consumption of the appliance in the energy savings mode;

providing, a grace period that defines a period of time that begins in response to a change from the normal operating mode to the energy savings mode, wherein, in response to the expiration of the grace period, the appliance prohibits the user to change the operation of the power consuming feature/function during the energy saving mode, thereby preventing additional use of the power consuming feature/function during the associated peak demand period; and returning to the normal mode after the peak demand period is over.

20. The appliance control method of claim 19, further including alerting a user of a peak demand period.

* * * * *

UNITED STATES PATENT AND TRADEMARK OFFICE
CERTIFICATE OF CORRECTION

PATENT NO. : 8,463,448 B2
APPLICATION NO. : 12/644722
DATED : June 11, 2013
INVENTOR(S) : Burt et al.

It is certified that error appears in the above-identified patent and that said Letters Patent is hereby corrected as shown below:

In the Specification:

In Column 3, Line 55, delete "controller" and insert - - controller 106 - -, therefor.

In Column 5, Lines 50-51, delete "an heating" and insert - - a heating - -, therefor.

In Column 6, Lines 43-44, delete "appliance 100" and insert - - appliance 200 - -, therefor.

In Column 7, Lines 9-10, delete "appliance 100" and insert - - appliance 200 - -, therefor.

In Column 8, Lines 50-51, delete "a energy" and insert - - an energy - -, therefor.

In Column 9, Line 55, delete "controller 104" and insert - - controller 206 - -, therefor.

In Column 9, Line 56, delete "appliance 100" and insert - - appliance 200 - -, therefor.

In Column 9, Lines 57-58, delete "controller 104" and insert - - controller 206 - -, therefor.

In Column 9, Line 58, delete "appliance 100" and insert - - appliance 200 - -, therefor.

In the Claims:

In Column 10, Line 59, in Claim 1, delete "supplying," and insert - - supplying - -, therefor.

In Column 10, Line 60, in Claim 1, delete "sayings" and insert - - savings - -, therefor.

In Column 11, Line 7, in Claim 2, delete "wherein to controller" and insert - - wherein the controller - -, therefor.

In Column 11, Line 36, in Claim 6, delete "period," and insert - - period - -, therefor.

Signed and Sealed this
Twenty-second Day of October, 2013

Teresa Stanek Rea
*Deputy Director of the United States Patent and Trademark Office*

CERTIFICATE OF CORRECTION (continued)
U.S. Pat. No. 8,463,448 B2

In Column 11, Line 48, in Claim 9, after "wherein", delete "the device".

In Column 11, Line 50, in Claim 9, delete "beating elements," and insert -- heating elements, --, therefor.

In Column 11, Line 54, in Claim 9, delete "enemy" and insert -- energy --, therefor.

In Column 12, Line 1, in Claim 11, delete "Wherein" and insert -- wherein --, therefor.

In Column 12, Lines 20-21, in Claim 13, delete "beating element" and insert -- heating element --, therefor.

In Column 12, Line 29, in Claim 14, delete "exhaust an," and insert -- exhaust fan, --, therefor.

In Column 13, Line 16, in Claim 17, delete "period" and insert -- period is --, therefor.

In Column 14, Line 11, in Claim 19, delete "providing," and insert -- providing --, therefor.

In Column 14, Line 16, in Claim 19, delete "saving mode," and insert -- savings mode, --, therefor.